United States Patent
Jegu et al.

(10) Patent No.: US 8,694,747 B2
(45) Date of Patent: Apr. 8, 2014

(54) METHOD AND DEVICE FOR LOADING AND EXECUTING INSTRUCTIONS WITH DETERMINISTIC CYCLES IN A MULTICORE AVIONIC SYSTEM HAVING A BUS OF WHICH THE ACCESS TIME IS NOT PREDICTABLE

(75) Inventors: Victor Jegu, Toulouse (FR); Benoit Triquet, Toulouse (FR); Frédéric Aspro, Tournefeuille (FR); Frédéric Boniol, Toulouse (FR); Claire Pagetti, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 138 days.

(21) Appl. No.: 13/376,022

(22) PCT Filed: Jun. 2, 2010

(86) PCT No.: PCT/FR2010/051071
§ 371 (c)(1),
(2), (4) Date: Dec. 2, 2011

(87) PCT Pub. No.: WO2010/139896
PCT Pub. Date: Dec. 9, 2010

(65) Prior Publication Data
US 2012/0084525 A1    Apr. 5, 2012

(30) Foreign Application Priority Data
Jun. 5, 2009    (FR) .................................... 09 02750

(51) Int. Cl.
*G06F 13/10* (2006.01)
(52) U.S. Cl.
USPC ........................................................ 711/163

(58) Field of Classification Search
None
See application file for complete search history.

(56) References Cited

U.S. PATENT DOCUMENTS

| | | | | | |
|---|---|---|---|---|---|
| 5,590,368 | A | * | 12/1996 | Heeb et al. ...................... | 712/43 |
| 2003/0091040 | A1 | | 5/2003 | Furukawa | |
| 2008/0320280 | A1 | | 12/2008 | Blixt | |

FOREIGN PATENT DOCUMENTS

EP    2 015 174    1/2009

OTHER PUBLICATIONS

Rosen, J., et al., "Bus Access Optimization for Predictable Implementation of Real-Time Applications on Multiprocessor Systems-on-Chip," 28th IEEE International Real-Time Systems Symposium, IEEE Computer Society, pp. 49-60, (Dec. 1, 2007) XP031194167.

(Continued)

*Primary Examiner* — Duc Doan
(74) *Attorney, Agent, or Firm* — Oblon, Spivak, McClelland, Maier & Neustadt, L.L.P.

(57) ABSTRACT

A method and device for loading and executing a plurality of instructions in an avionics system including a processor including at least two cores and a memory controller, each of the cores including a private memory. The plurality of instructions is loaded and executed by execution slots such that, during a first execution slot, a first core has access to the memory controller for transmitting at least one piece of data stored in the private memory thereof and for receiving and storing at least one datum and an instruction from the plurality of instructions in the private memory thereof, while the second core does not have access to the memory controller and executes at least one instruction previously stored in the private memory thereof and such that, during a second execution slot, the roles of the two cores are reversed.

10 Claims, 9 Drawing Sheets

(56) References Cited

OTHER PUBLICATIONS

Figure 1:
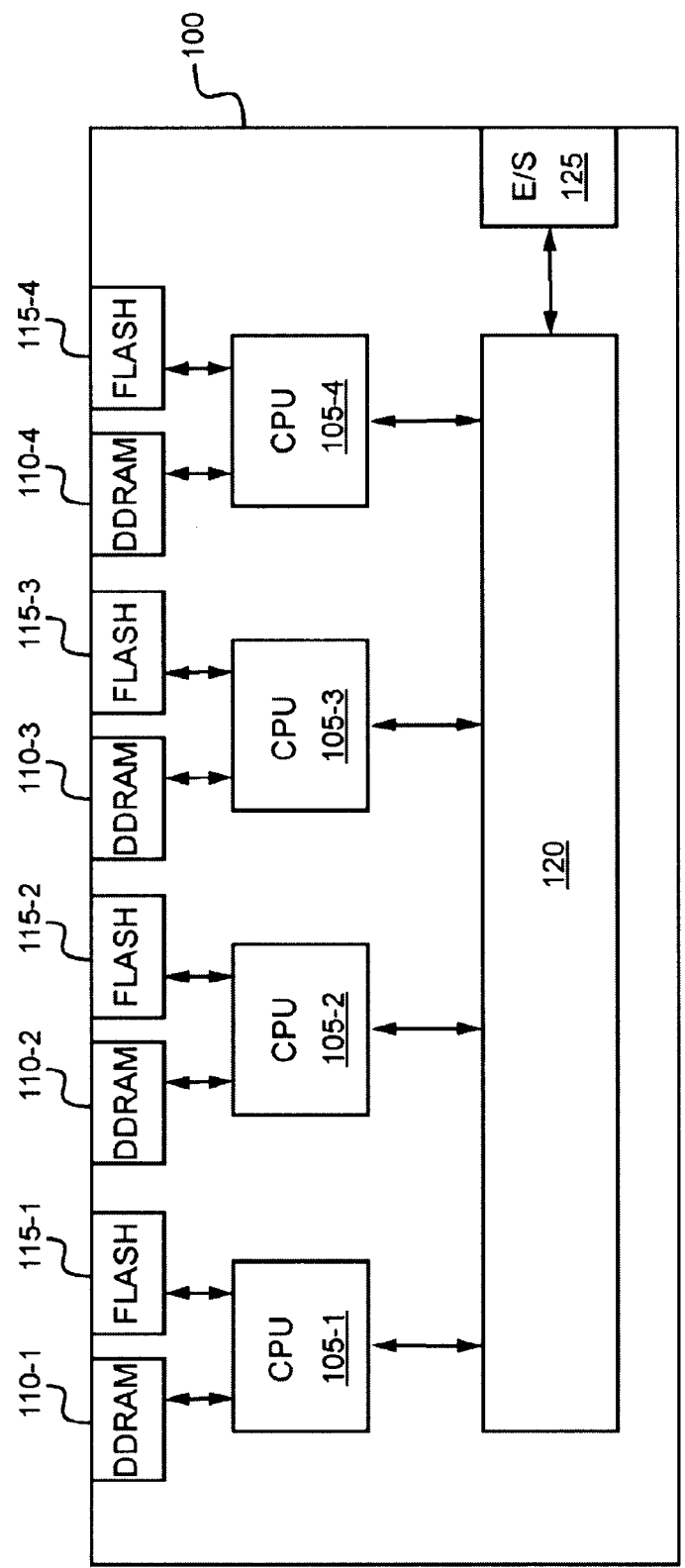

Kim, J., et al., "A Cost-Effective Latency-Aware Memory Bus for Symmetric Multiprocessor Systems," IEEE Transactions on Computers, vol. 57, No. 12, pp. 1714-1719, (Dec. 1, 2008) XP011247299.

Zheng, H., et al., "Memory Access Scheduling Schemes for Systems with Multi-Core Processors," 37th International Conference on Parallel Processing, IEEE Computer Society, pp. 406-413, (Sep. 9, 2008) XP031321576.

International Search Report Issued Oct. 18, 2010 in PCT/FR10/051071 Filed Jun. 2, 2010.

* cited by examiner

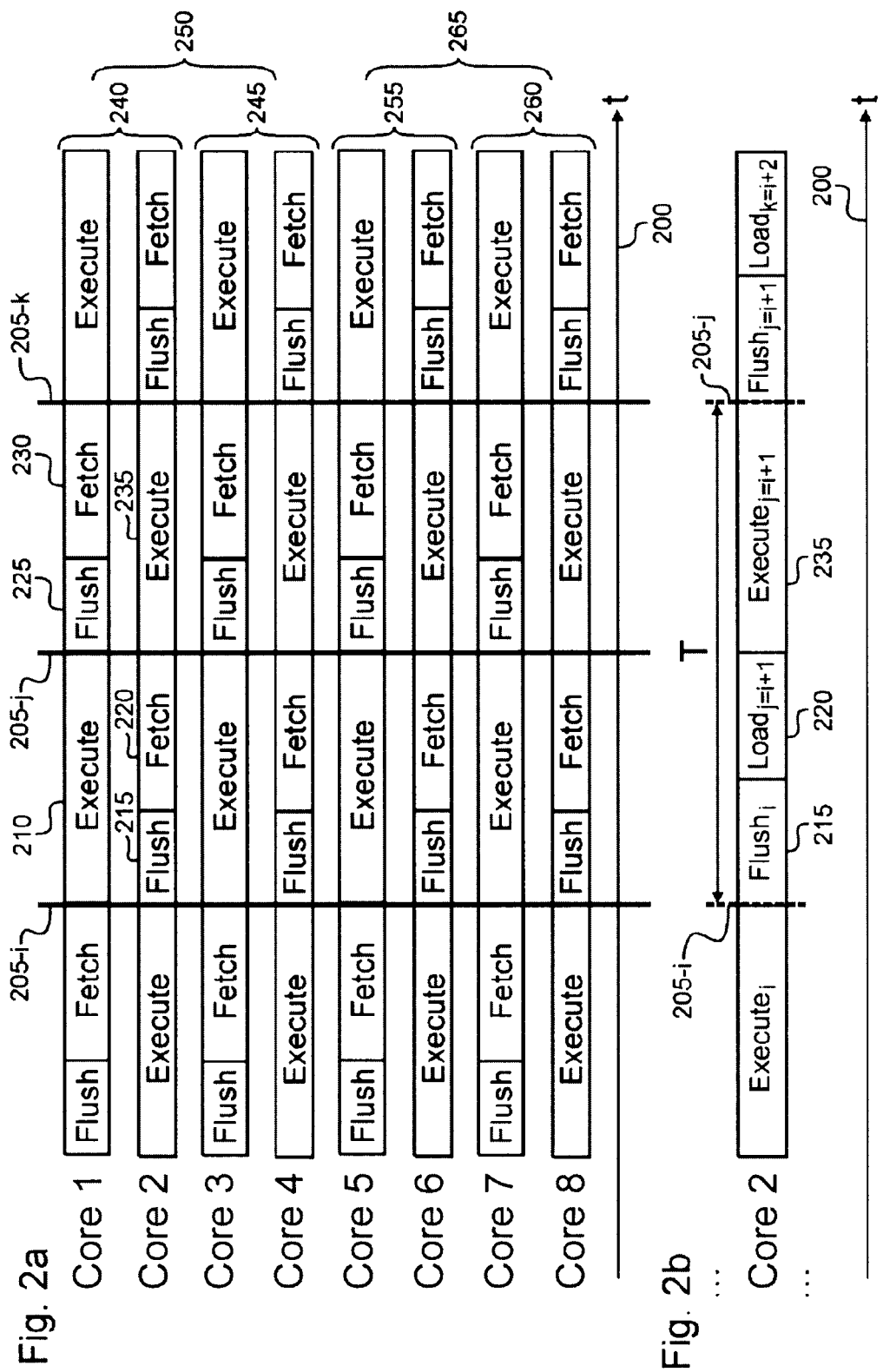

METHOD AND DEVICE FOR LOADING AND EXECUTING INSTRUCTIONS WITH DETERMINISTIC CYCLES IN A MULTICORE AVIONIC SYSTEM HAVING A BUS OF WHICH THE ACCESS TIME IS NOT PREDICTABLE

The present invention relates to the architecture of systems of avionic type and more particularly to a method and a device for loading and executing instructions with deterministic cycles in a multicore avionic system having a bus, the access time of which is unpredictable.

Modern aircraft are increasingly comprising electronic and IT systems to improve their performances and to assist the pilot as well as the crew members during their missions. Thus, for example, the electrical flight controls make it possible to reduce the mechanical complexity of transmission of commands to the actuators and therefore the mass associated with these controls. Similarly, the presentation of pertinent information allows the pilot to optimize the flight trajectories and to respond rapidly to any detected incident. Such information items include in particular speed, position, heading, meteorological and navigation data. The entirety of these electronic and IT systems is generally referred to as avionics.

For reasons in particular of reliability, simplicity and certification, the avionics have often been distributed functionally by specific modules, also known as LRU (initials for Line Replaceable Unit in English terminology). Thus, for example, the flight controls are managed in one particular device, while the electrical supply is managed in another. In this way a specific function is associated with each module.

Furthermore, each module supporting a critical function is preferably redundant, so that failure of one module does not lead to loss of the associated function. The operation of an aircraft using a redundant module when the main module is failing necessitates a maintenance operation.

In order to improve the functionalities of aircraft, to reduce the weight of the electronic equipment and to facilitate the maintenance operations, the avionics are now being increasingly integrated in an architecture known as IMA (initials for Integrated Modular Avionics in English terminology). According to this architecture, the functionalities are decorrelated from the systems, or in other words the computers or calculation resources in which they are implemented. Nevertheless, a segregation system makes it possible to isolate each of the functionalities so that the failure of one function does not have any influence on another.

Such systems employ different modules, in particular data-processing modules, known as CPM (initials for Core Processing Module in English terminology), data switching modules, known as ASM (initials for Avionic Switch Module in English terminology), and electrical supply modules, also known as PSM (initials for Power Supply Module in English terminology).

The data processing modules comprise so-called "high performance" modules for the general avionic applications, "time critical" modules for avionic applications subject to tight constraints of time determinism, and modules of server type for non-critical, open world type.

A data processing module is generally composed of one or more processors, also known as CPU (initials for Central Processing Unit in English terminology), associated with one or more memory banks of RAM (initials for Random Access Memory in English terminology) and FLASH type.

The communications between several CPUs of a CPM are preferably assured by means of direct links to a shared memory or via an exchange memory of a communication interface, for example an AFDX interface (initials for Avionic Full DupleX in English terminology).

In order to permit calculation of the WCET (initials for Worst Case Execution Time in English terminology), the data-processing modules known as time-critical modules must use processors and memory architectures permitting their time determinism.

To achieve a so-called time-critical data-processing module, called CPM TC (initials for Core Processing Module Time Critical in English terminology) in the description hereinafter, a large number of relatively simple processors may be used, with execution of the code in static RAM memory or in memory of flash type, in order to guarantee time determinism.

FIG. 1 schematically illustrates a CPM employing such an architecture. As illustrated, this CPM 100 comprises four "single core" processors 105-1 to 105-4 and, associated with each processor, memories of DDRAM type (initials for Double Data rate Random Access Memory in English terminology), generically denoted by 110, and of flash type, generically denoted by 115. Furthermore, the CPM comprises an assembly 120 of logic circuits, which in particular permits processors 105-1 to 105-4 to exchange data with other components of the aircraft via an input/output module 125.

However, the use of a large number of processors increases the risk of breakdown or MTBF (initials for Mean Time Between Failures in English terminology), as well as the weight and the development costs.

Furthermore, despite the calculating power required in the CPM TCs, superscalar high-performance processors, which execute the code instructions from a dynamic RAM memory bank, are not used or are poorly used because of the memory refresh time, changes of lines, columns and/or banks, and above all because of the greater latency of the memory controller. In other words, the CPM TCs generally do not effectively employ processors based on multi-core architectures using cache memories.

In fact, the CPM TCs have a need for strong determinism of their execution time, and their cache memories create variability that is difficult to determine due to a historical effect, according to which, depending on past events, an information item may still be or may not be present in cache memory. It may then be necessary to reload it, without that being determined in advance. The same is true for pipeline type instruction sequences of the processor cores and memory controllers, for which the instructions may be distributed over several cycles, thus creating historical dependences.

Consequently, to be deterministic, the CPM TCs must discard the mechanisms causing these variabilities and must use margins making it possible to determine the execution times in advance, thus making the use of multi-core processors inefficient.

The invention makes it possible to resolve at least one of the problems described in the foregoing. More particularly, it is possible, according to the invention, to determine the use of cache memories of multi-core systems in advance, so that the latency of the memories is no longer a performance-limiting factor. The invention also makes it possible, in a multi-core, multi-processor architecture, or more generally a shared processor bus architecture, to achieve non-pessimistic independence of calculation cores and determination of WCET. In addition, the independence relative to the latency of cache memories permits determination of WCET even if the memory and memory controller models are imprecise.

The object of the invention is therefore a method for loading and executing, with deterministic execution cycles, a plurality of instructions in an avionic system comprising at least one processor having at least two cores and at least one memory controller, each of the said at least two cores having a private memory, the said plurality of instructions being loaded and executed by execution slots, the method comprising the following steps, during a first execution slot,
authorizing a first of the said at least two cores to access at least one memory controller, the said first core transmitting to the said at least one memory controller at least one datum stored in its private, previously modified memory, and receiving at least one datum and at least one instruction of the said plurality of instructions, the said at least one datum and the said at least one instruction received being stored in its private memory;
prohibiting a second of the said at least two cores from accessing the said at least one memory controller, the said second core executing at least one instruction previously stored in its private memory;
during a second execution slot,
prohibiting the said first core from accessing the said at least one memory controller, the said first core executing at least one instruction previously stored in its private memory; and
authorizing the said second core to access the said at least one memory controller, the said second core transmitting to the said at least one memory controller at least one datum stored in its private, previously modified memory, and receiving at least one datum and at least one instruction of the said plurality of instructions, the said at least one datum and the said at least one instruction received being stored in its private memory.

In this way the method according to the invention makes it possible to employ technologies based on multi-core processors having buses whose access time is unpredictable for applications having strong time determinism constraints. In particular, the method makes possible the use of memories of DDRx type functioning in group mode (referred to as burst mode in English terminology), of cores working at frequencies higher than 1 GHz, the employment of massively parallel architecture and electronic integration in the form of unique components.

Although the subdivision of the activity of the cores into long execution phases, without access to a shared memory, and long phases of access to a shared memory, without calculation, seems inefficient at first sight, this is because of the envisioned avionic applications and of the subdivision of the applications.

For the execution model to be efficient, the time of the memory access phases is advantageously shorter than the total time a core spends waiting for completion of each of these accesses.

Another significant advantage is the simplification and large reduction of pessimism of calculations of WCET by static analysis, because of the fact of the presence, in private memory, of data used in the calculation phases. Another advantage concerns the static analysis tools based on a model of the processor. Since the tool does not have to consider, in its analyses, the scenarios that include accesses to the shared memory, the processor model may be reduced to the single core and its private memories.

This approach is also compatible with and adapted to the evolutions of memory technologies, which are evolving toward very high rates without commensurate shortening of latencies, the objective here being to supply increasingly larger and more numerous private memories.

According to a particular embodiment, the said at least one processor additionally comprises at least one second memory controller, the method additionally comprising the following steps,
during a first phase of the said first execution slot, authorizing the said first core to access a first of the said at least two memory controllers and prohibiting the said first core from accessing a second of the said at least two memory controllers;
during a second phase of the said first execution slot, authorizing the said first core to access the said second memory controller and prohibiting the said first core from accessing the said first memory controller;
during a first phase of the said second execution slot, authorizing the said second core to access the said first memory controller and prohibiting the said second core from accessing the said second memory controller; and
during a second phase of the said second execution slot, authorizing the said second core to access the said second memory controller and prohibiting the said second core from accessing the said first memory controller.

In this way the method permits the cores to access shared memories in order to execute instructions using common data.

According to a particular embodiment, at least one of the said at least two cores is dedicated to operations of transmission and reception of data to and from a network communication interface in order to simplify the modeling of the processor.

The invention also has as an object a method for processing a plurality of instructions to permit loading and executing, with deterministic execution cycles, the said plurality of instructions according to the method described in the foregoing, the processing method comprising a step of subdividing the said plurality of instructions into execution slots, each execution slot comprising a transfer sequence and an execution sequence, the said transfer sequence permitting transmission of at least one datum previously stored in memory and the reception and storage in memory of at least one datum and at least one instruction, the said at least one received datum being necessary for execution of the said at least one received instruction and permitting execution of the said at least one received instruction in autonomous manner during execution of the said execution sequence.

In this way the processing method makes it possible to subdivide the instructions into execution slots in order to optimize the described method of loading and execution, whose efficiency depends on the capacity to determine precisely the information items necessary to a subsequent phase of execution, so as to avoid underestimating or overestimating the quantity of information items necessary, which has the effect of requiring access to the shared memory for execution of instructions or of generating a loading phase longer than the time that the core would spend on loading each datum.

According to a particular embodiment, the said subdivision step is based on solving a system of linear equations representing constraints on execution of instructions of the said plurality of instructions according to at least one characteristic of the said at least one processor.

In this way the method according to the invention makes it possible to optimize the organization of the execution slots and to simplify their determination.

The duration of the said execution slots is preferably constant and predetermined. This duration is, for example, determined by the time of transmission of previously modified data and the time of reception of data and of instructions to be executed.

The invention also has as an object a computer program comprising instructions adapted to employment of each of the steps of the method described in the foregoing when the said program is executed in a processor, a device comprising means adapted to employment of each of the steps of the method described in the foregoing as well as an aircraft comprising the device according to the preceding claim. The advantages achieved by such a computer program and such a device are similar to those mentioned in the foregoing.

Figure 2C:
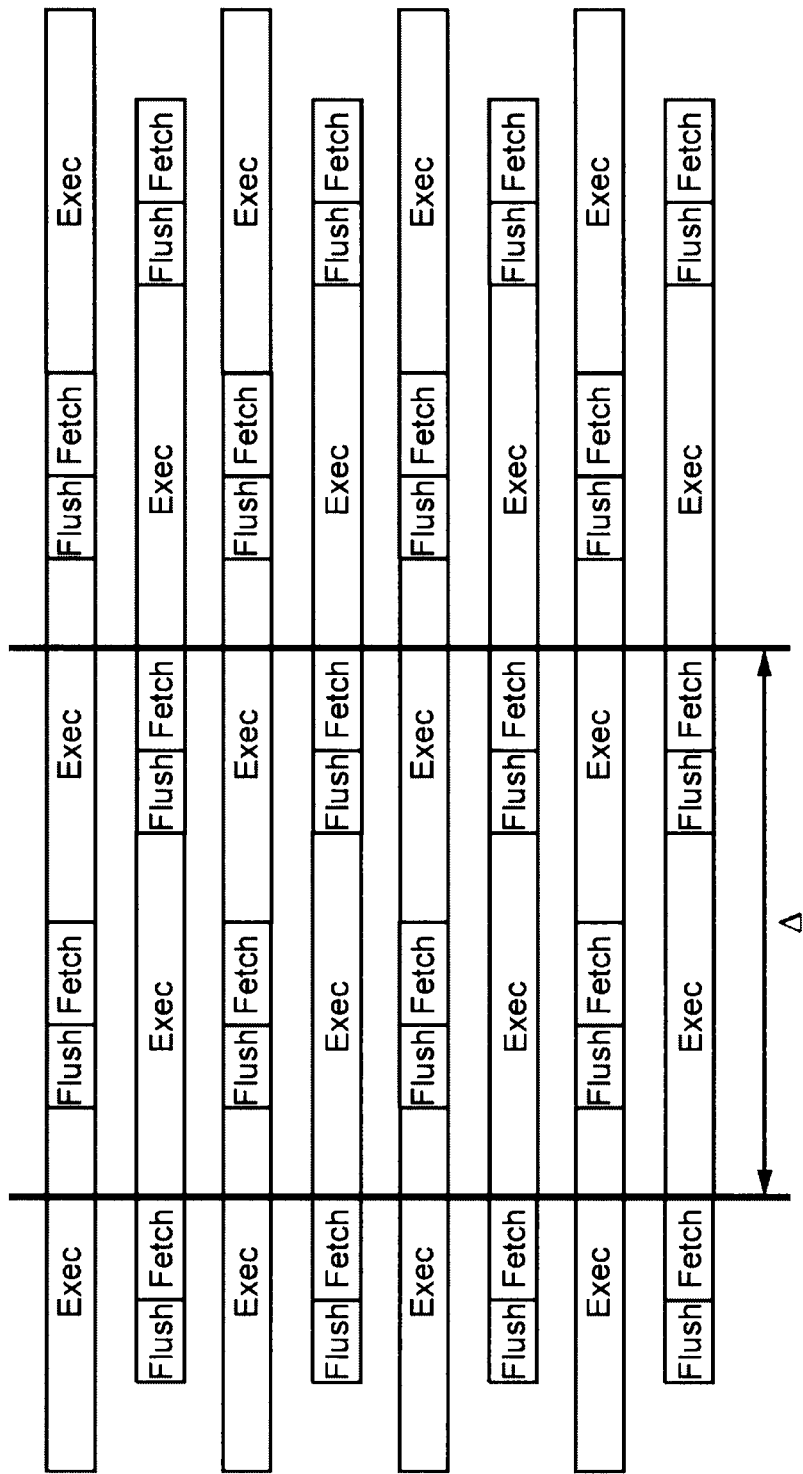
Figure 2D:
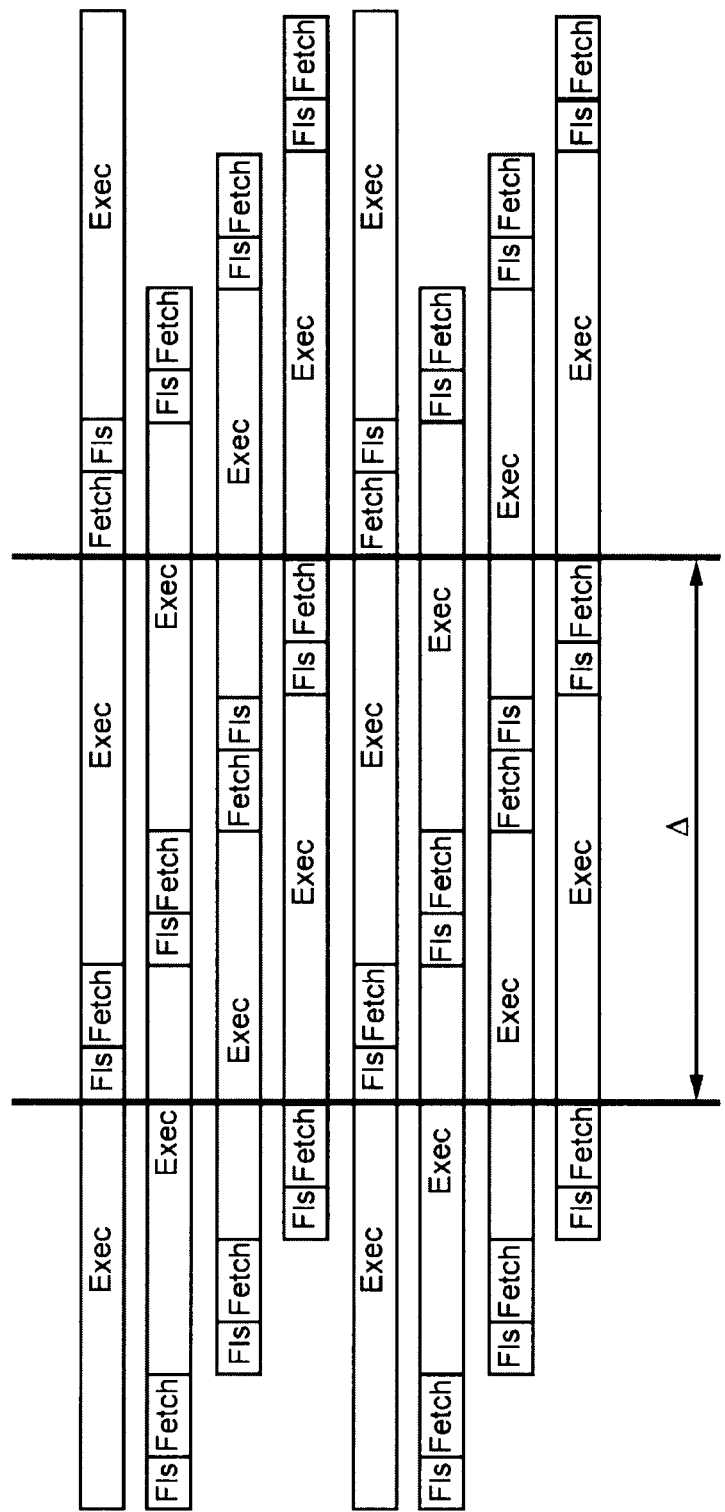
Figure 3A:
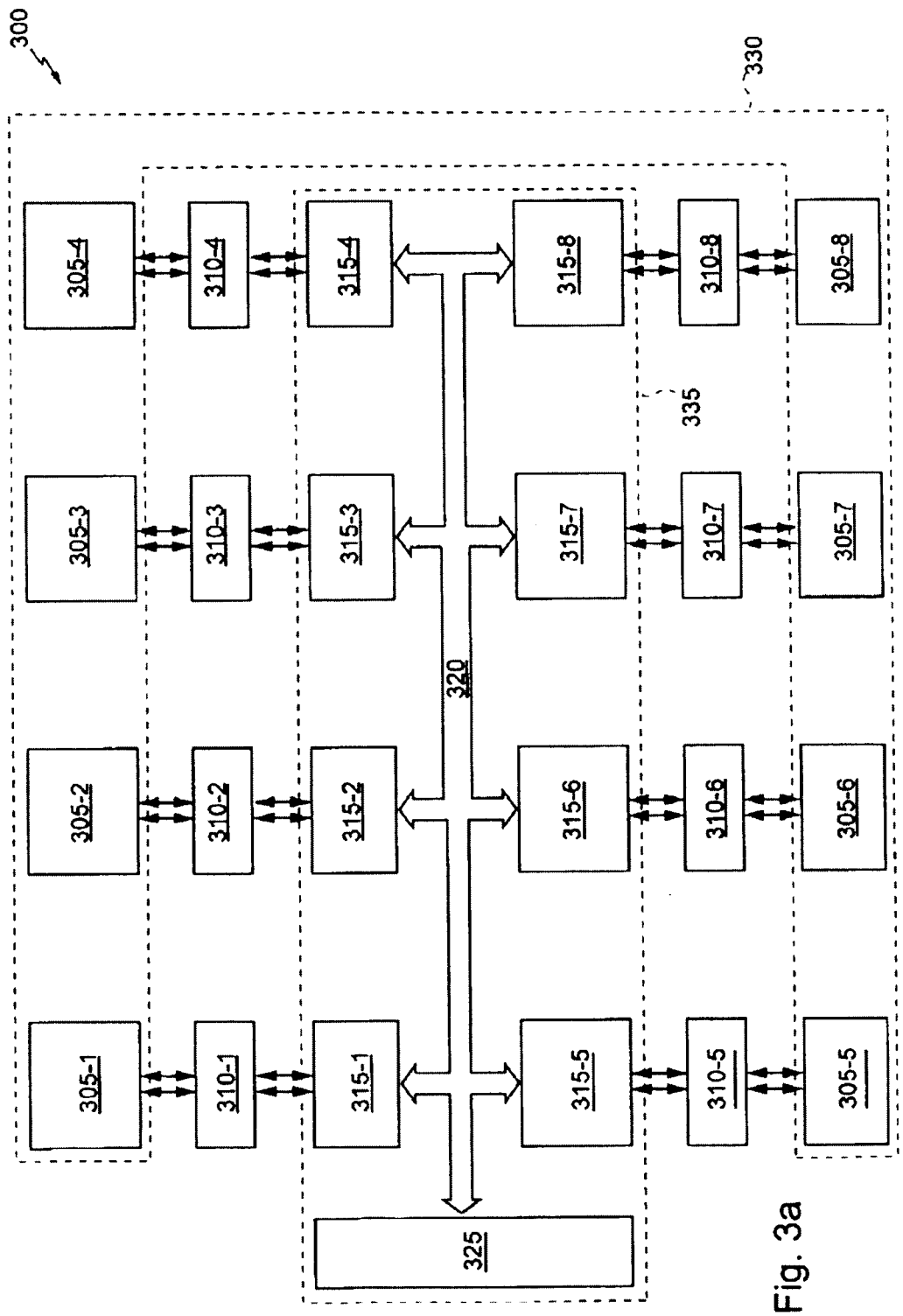
Figure 3B:
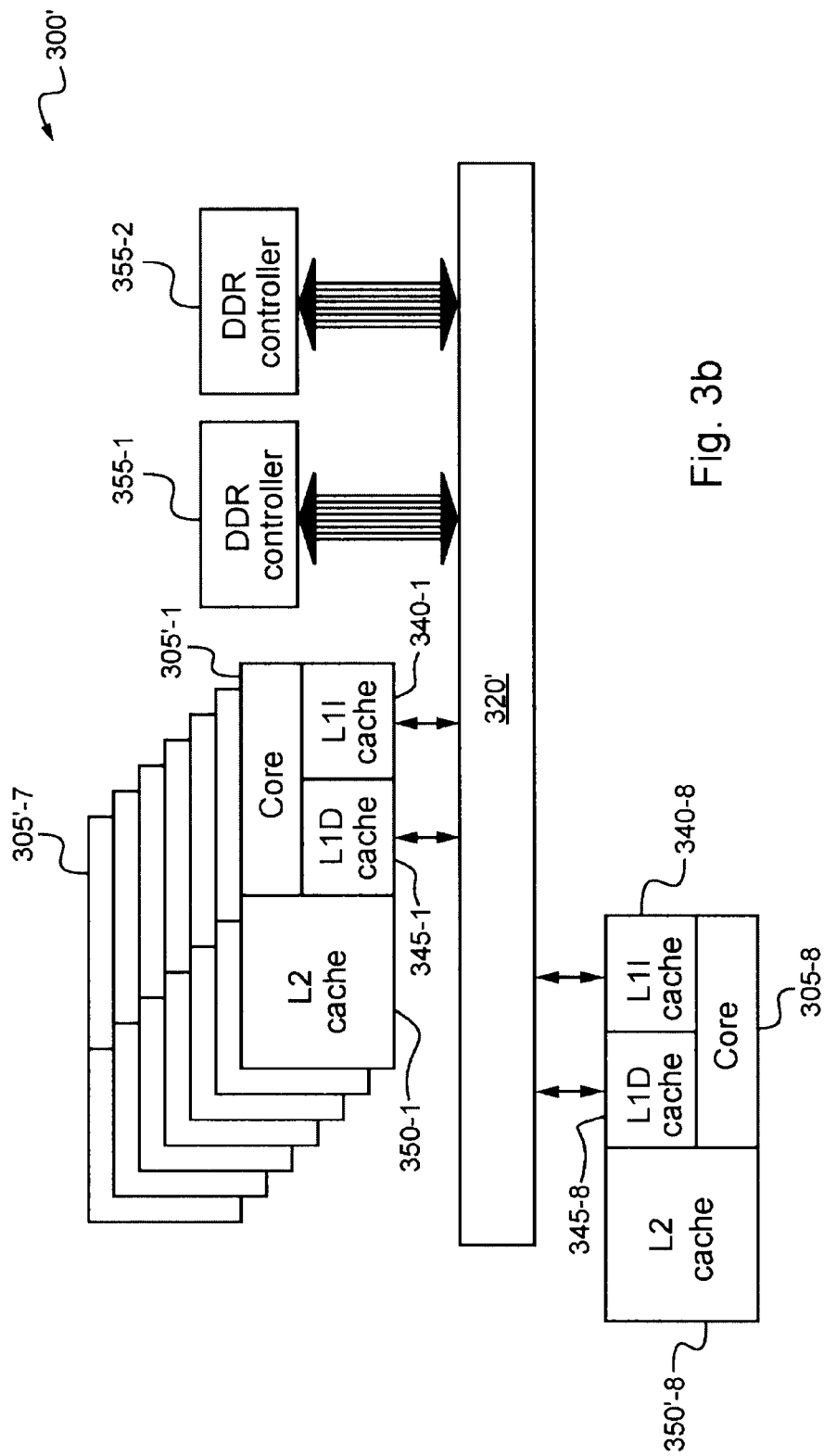
Figure 4A:
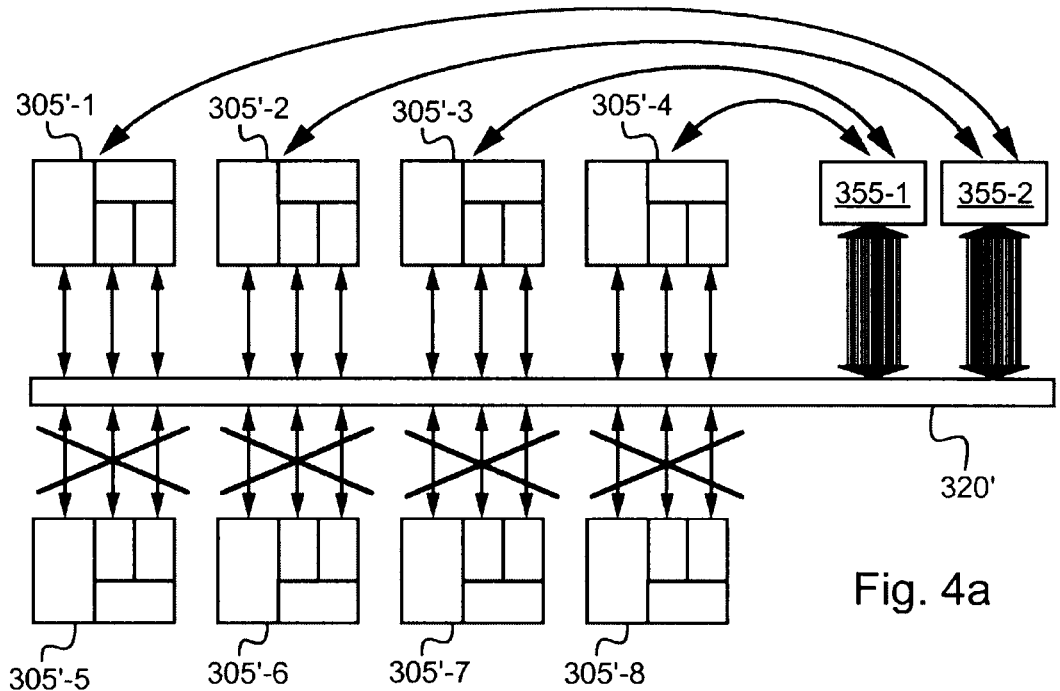
Figure 4B:
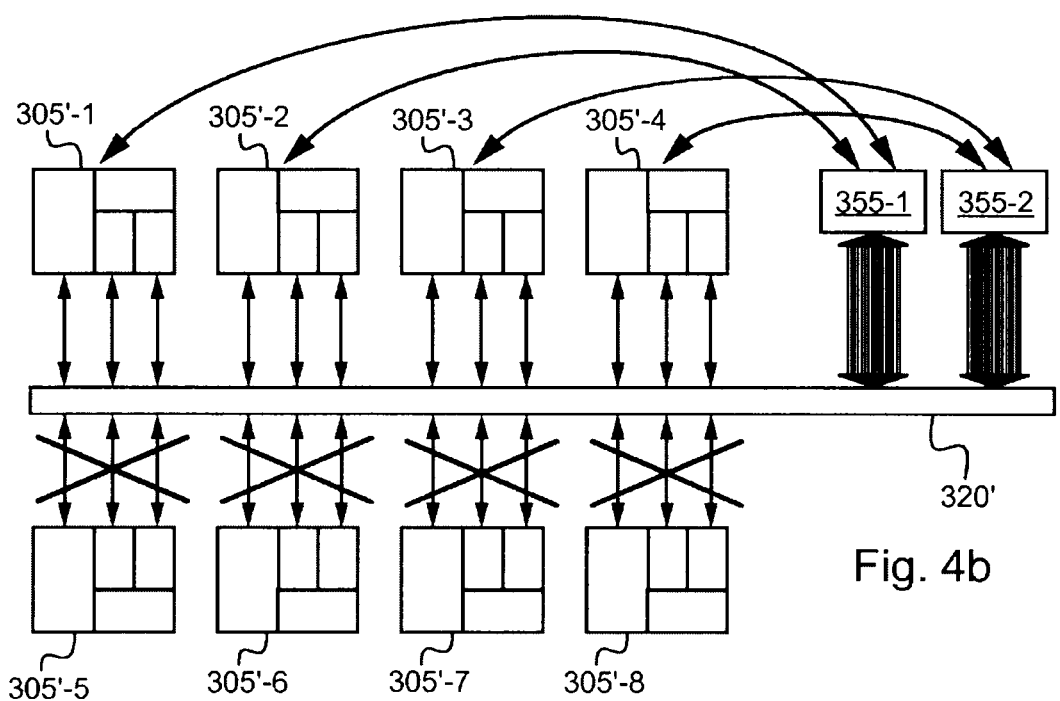
Figure 4C:
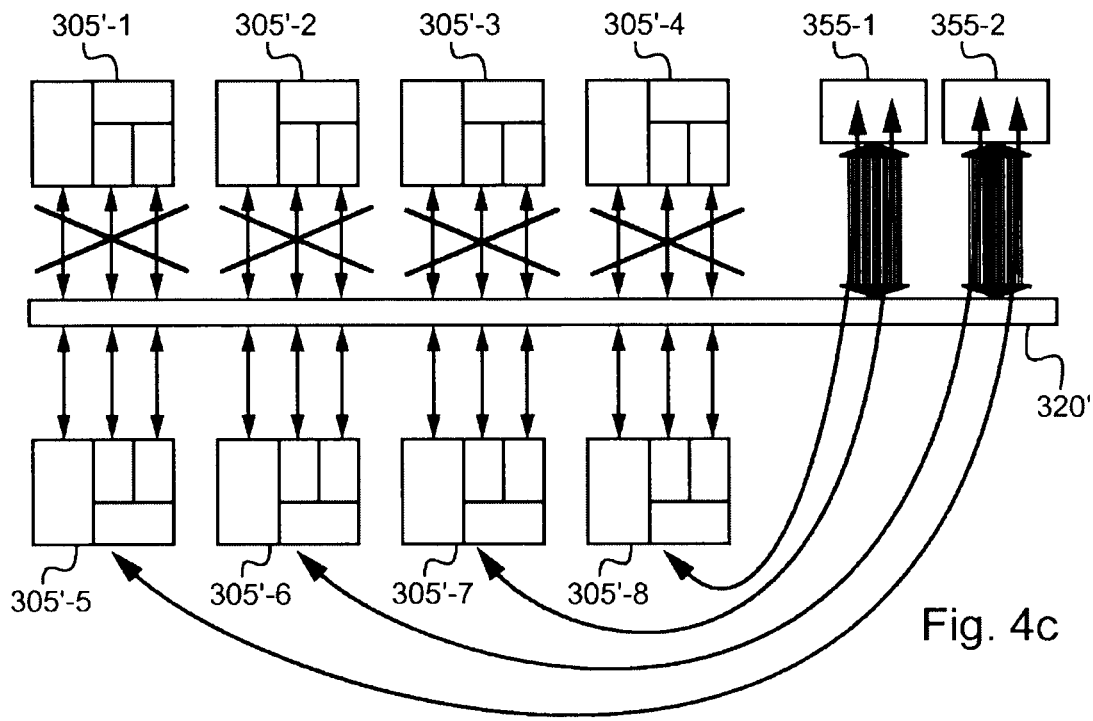
Figure 4D:
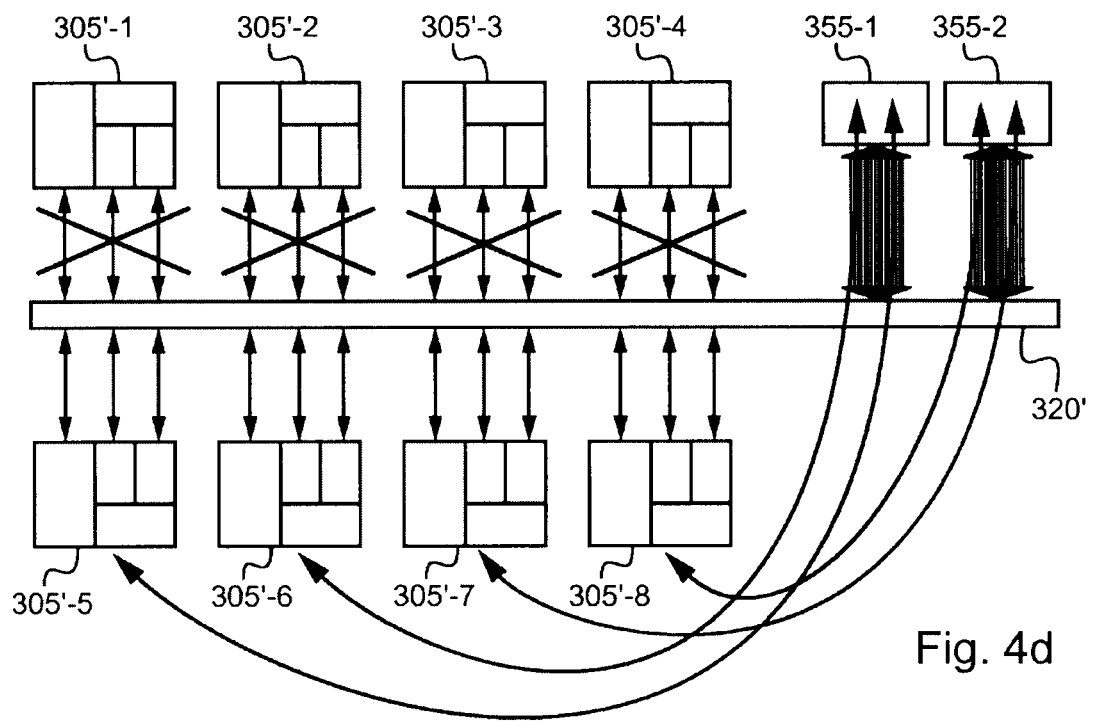
Figure 5:
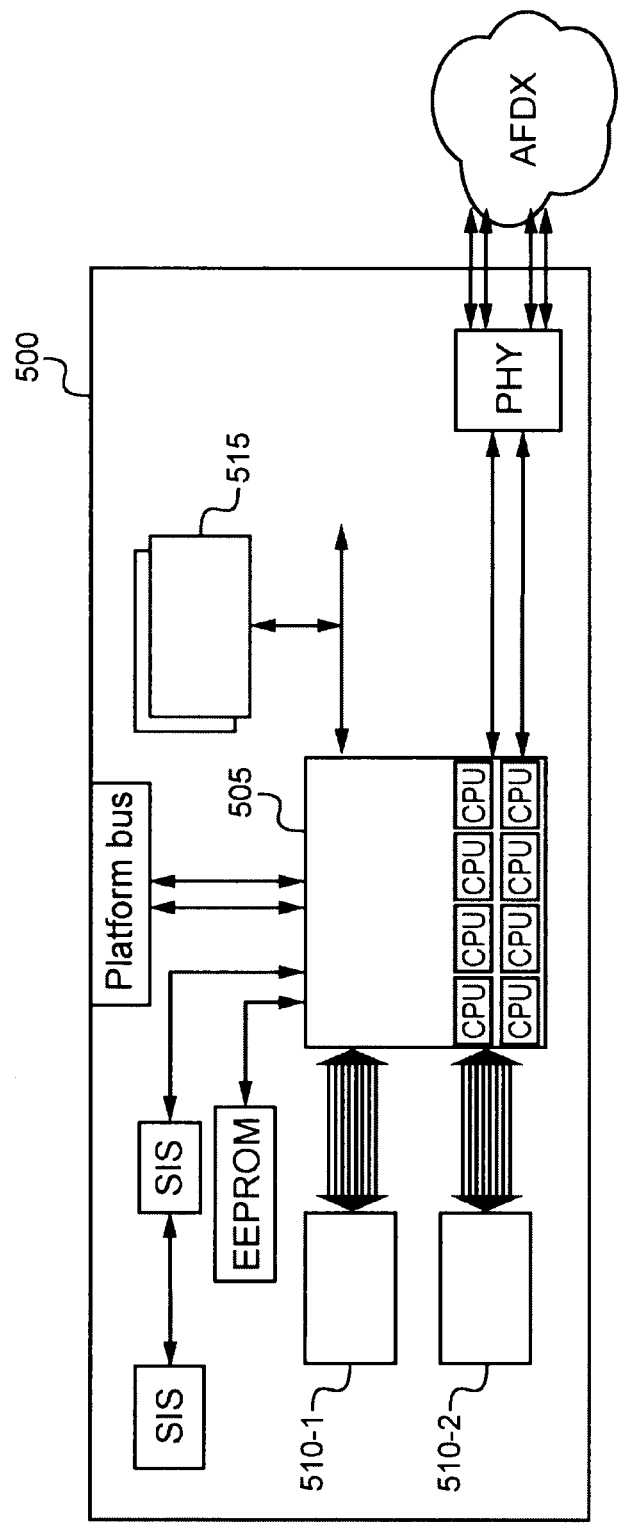

Other advantages, objectives and characteristics of the present invention become apparent from the detailed description hereinafter, provided by way of non-limitative example, with reference to the attached drawings, wherein:

FIG. 1 schematically represents a data-processing module comprising several single-core processors;

FIG. 2, comprising FIGS. 2a to 2d, schematically illustrates a time diagram showing the activities of a processor comprising eight cores, employed in conformity with the invention;

FIG. 3, comprising FIGS. 3a and 3b, illustrates an example of multi-core architecture adapted to employment of the invention;

FIG. 4, comprising FIGS. 4a to 4d, illustrates an example of the mechanism by which each core in transfer phase of a multi-core processor accesses the memory controllers of this processor; and FIG. 5 schematically illustrates a module of an avionic system, whose architecture is based on a multi-core processor such as that presented in FIG. 3b, adapted to employment of the invention.

The multi-core processors of the last generation, also known as SoC multicores (initials for System on Chip in English terminology), offer great potential in calculating power. However, within the context of critical real-time applications, it is difficult to exploit this potential, especially for reasons of determinism and proof or test relative to time requirements.

It is recalled here that the notion of real time implies precise mastery of the time behavior of applications being executed, especially of their WCET. In the field of aeronautics, the term "critical" requires that strong proof of this mastery be furnished.

This problem of determinism arises partly from the execution of one or more competing applications on each of the cores that are sharing certain resources of insufficient number for physical segregation of all the paths of all the cores, particularly of the data-exchange bus and of the memories used. If such sharing is not mastered (ideally, mastered accesses are temporally exclusive accesses), they introduce generally innumerable conflicts. Alternatively, the overestimate by an analysis of the worst eventuality type, or worst case in English terminology, is too pessimistic and leads to extreme under-exploitation of the multi-core processor.

Another source of indeterminism results from the intrinsic complexity of SoCs, wherein the assembly of components creates historical phenomena making a worst case analysis with reasonably little pessimism prohibitive in terms of calculating cost. The lack of observability within SoCs and the absence of documentation pertaining to their architecture also make it impossible to create reliable time models adapted to WCET analyses.

The system according to the invention makes it possible to circumvent these difficulties.

Firstly, it is recalled that each core in the interior of an SoC has one or more private cache memories. Typically, the cores envisioned in CPMs possess three private cache memories per core: one cache memory L1_I (or L1I) for the instructions, one cache memory L1_D (or L1D) for the data and one unified cache memory L2 for the instructions and the data. Whereas it is important here that each core have an individual cache memory and instructions for loading and unloading them, the number of levels of the cache memories is of little importance.

Alternatively, each core may access a local memory having an address on the core network (core network). Similarly, the invention may be employed with an internal device of the SoC, external to the cores, of DMA SoC type (DMA is the initials for Direct memory Address in English terminology), driven by the cores or activated on a fixed date on the basis of a task calendar, this device being in charge of transferring the data in both directions between the memories associated with the cores, of RAM type, and the central memories of DDR type.

As long as an application is being executed only in these cache memories, there is no problem of conflict of resources due to the multi-core architecture. The problems of complexity of SoCs are also greatly reduced in this case, because the models necessary for determination of the WCETs are limited to the cores and to their cache memories. However, the cache memories generally do not have sufficient size to store the applications in their entirety. In addition, the applications being executed, by their nature, need to receive and transmit data across input/output interfaces, referred to as I/O (initials for Input/Output in English terminology).

The principle of the system according to the invention is to create phases during which the applications are executed exclusively in the interior of their private cache memories, without being influenced by any external effect (data access or surveillance).

This principle provides the following benefits:

the execution of the phases is completely independent of the activity of the other cores, and the WCET analysis of these phases can take place by a traditional single-core approach; and the determination of WCETs does not necessitate any model other than that of the cores and their private cache memories. In particular, a model of inter-core data buses and of the memory controller is not required.

However, it should be noted that, as mentioned in the foregoing, the applications generally cannot be completely contained in the private cache memories of cores. Furthermore, a core is generally not dedicated to a particular application. In addition, its data are not local, since an application necessarily having to consume and produce data used by other applications. Consequently, it is necessary to manage the accesses to a shared memory and/or accesses to one or more networks in order to load and unload code instructions and the application data. However, these accesses must be scheduled, so that they will be exclusive (ideally) between the cores as well as numerable and distributed so that the worst-case conditions are overestimated as little as possible in terms of processing time.

A solution for scheduling these accesses consists in particular of defining meeting points between which a core has exclusive access and access shared with a minimum of other cores to each resource (for example a particular memory controller). Outside these ranges, the core cannot access these resources. Thus it is necessary to distribute the meeting points so that each core has equitable access to the resources. Advantageously, these meeting points are placed in static and regular manner.

In this way, for example, for a processor having eight cores and two memory controllers, four cores are authorized, for equivalent durations of execution and memory access, to access a memory at any instant via the two memory controllers, this access being prohibited for the other four cores. Advantageously, among the four cores able to access the memory controllers, two and only two access each memory controller at any instant. A shorter memory access duration makes it possible to dedicate more time to the execution phase, without memory access, without changing the total duration of the cycle of memory and execution. A shorter memory access duration makes it possible to limit the number of cores accessing the memory at any instant.

FIG. 2, comprising FIGS. 2a and 2b, schematically illustrates a time diagram showing the activities of a processor comprising eight cores, employed in conformity with the invention. The type of activity of each of the cores is represented here along time axis 200. FIG. 2b shows part of FIG. 2a once again to illustrate more precisely the roles of a particular core, in this case the second.

References 205-$i$, 205-$j$ and 205-$k$ define instants representing static and regular meeting points where the cores change their role. Thus, for example, at instant 205-$i$, the first core executes a series of instructions previously stored in its cache memory with the corresponding data (reference 210). Starting from the same instant, the second core exchanges data with a memory controller. First, it transmits data stored in its cache memory to the memory controller (reference 215). Then, secondly, it receives data and instructions from the memory controller, and stores them in its cache memory (reference 220). In this way the second core is prepared for a phase of autonomous execution during which it will not need to access the memory controllers.

The period separating two consecutive instants at which each core changes roles defines an execution slot, denoted by T.

Then, at instant 205-$j$, the first core transmits data stored in its cache memory to the memory controller (reference 225), then receives data and instructions from the memory controller and stores them in its cache memory (reference 230). Starting from the same instant 205-$j$, the second core executes the instructions previously stored in its cache memory with the corresponding data (reference 235).

Once again, at instant 205-$k$, the first core executes the previously received instructions while the second core transmits and receives data and instructions.

A similar mechanism is employed in all of the cores.

As indicated in the foregoing, the SoC comprising the processor whose operation is illustrated in FIG. 2 also comprises, preferably, two memory controllers. Thus the two pairs of cores 240 and 245 of assembly 250 each access a different memory controller, so that, within this assembly, each memory controller is accessed at a given instant by only a single core. Similarly, the two pairs of cores 255 and 260 of assembly 265 each access a different memory controller, so that, within this assembly, each memory controller is accessed at given instant by only a single core. Thus, at a given instant, each memory controller is accessed by two separate cores.

It should be noted here that, although the SoC has several memory controllers, the access of the cores to each of the memory controllers is advantageously equilibrated. However, a single memory controller may be used, especially if it is sufficient to serve the performance needs of the CPM TC. In this case, the use of a single memory controller makes it possible to improve the development costs as well as the reliability, the mass and the heat dissipation of the SoC.

The establishment of the order of transfer phases over the assembly of cores is preferably strictly synchronous, equilibrated and scheduled. The use of shared resources, especially of memory controllers, is preferably also strictly synchronous, equilibrated and scheduled. Thus, if the SoC contains two memory controllers, half of the cores in transfer phase accesses, at any instant, one of the memory controllers, and the other half accesses the other memory controller. If necessary, at predefined instants, all or part of the cores in transfer phase may change memory controller in order to maintain the exact equilibrium. Two strategies may be employed:

dedicating a single memory controller per execution slot, an execution slot representing all of the instructions executed by a core between two consecutive meeting points. In this case, however, the execution slot cannot participate in calculation processes employing particular functions that use the other memory controller. Such a strategy leads to creation of calculation domains specific to each memory controller, with a problem of communication between the memory controllers which may prove difficult to manage, especially for I/Os using a particular core; and obligating each execution slot to communicate equitably with each memory controller. Such an equilibration constraint is not difficult to achieve. The data are generally private for each execution slot. In addition, they may be duplicated if necessary, as for all the instructions. Furthermore, these data may be placed without discrimination on one memory controller or the other in order to equilibrate sharing.

Although the sharing of one memory controller between two cores is not an optimum solution relative to the core, this solution is nevertheless preferable relative to the memory controller, because a single core generally cannot maintain a request pipeline sufficiently long to eliminate completely the latency of the memories being used. In fact, when P cores are operating in tandem, to the extent that each access request does not depend on completion of the N preceding requests, where N is the pipeline depth for access by a core (or in other words the capacity of the entity referred to as Load Store Unit (LSU) in English terminology), the pipeline formed in the memory controller has a length of P×N, which makes it possible to achieve the optimum efficiency of the memories being used (often considered as being one of the major bottlenecks in a multi-core system).

By way of illustration, for cores having a pipeline of 5 (LSU), two cores form a pipeline of 10 requests in the memory controller, corresponding to 80 data transfers of burst type of 8 data per request. Thus it is sufficient for the latency of a request to be shorter than 40 cycles, by using a double transfer rate (double data rate) to avoid having a period of inactivity in the pipeline of the memory controller.

Concerning the length of execution slots, or in other words the spacing of consecutive meeting points, the following time references can be identified, worst case time for executing the code instructions loaded in cache memory with their associated data. Although this time depends on the nature of the application being executed, it is relatively constant for avionic applications; and, worst case time for transferring modified data to the memory controllers from cache memories and for loading, from the memory controllers, the instructions, constants and variables of an execution slot into the cache memories. This time depends on the number of competing cores.

It should be noted here that closely spaced meeting points are possible, but they increase the number of execution slots and the size of the problem of placing instructions and data for processing in execution slots. This fragmentation of processing operations also increases the total volume of data to be loaded into and unloaded from cache memories.

Although FIGS. 2a and 2b illustrate an example of optimum placement when the duration of the loading/unloading phase is identical to that of the phase of execution of instructions, numerous other distributions are possible. By way of illustration, FIGS. 2c and 2d show examples of optimum placement when the duration of the phase of execution of instructions is shorter than three times that of the loading/unloading phase and longer than or equal to three times that of the unloading/loading phase respectively, $\Delta$ representing the duration of an execution slot.

FIG. 3, comprising FIGS. 3a and 3b, illustrates an example of multi-core architecture adapted to employment of the invention.

Multi-core system 300, schematically represented in FIG. 3, in this case comprises eight cores referenced 305-1 to 305-8, each connected to a local memory with an access duration that is short, invariant and independent of history, or in other words of the previous execution of the calculation unit to which is it connected. In this case these local memories are denoted by references 310-1 to 310-8. They may be local cache memories or static memory blocks accessible by virtual or physical addressing from the calculation units. Each local memory is itself connected to a bus unit, whose references are 315-1 to 315-8, connected in turn to a common bus 320 connected to a shared memory 325.

The cores form arithmetic, logical, floating or other calculation units that execute the complex processing operations. They access only the local memory to which they are connected.

The problem of calculating WCET for cores forming domain 330 is decorrelated from the multi-core characteristic and from the problem of modeling of the shared external memory and from the interconnection network of cores forming domain 335.

Furthermore, the cache memories or static memory blocks are maintained in coherence and supplied by a multi-actor system simpler than the cores. In particular, the variability due to the inputs, the combinatorial effect due to branching decisions, all the speculative decisions that may be made by the execution units and the entire variability due to uncertainties of synchronization between the cores are unknown to domain 335. In practice, because of the absence of variability, it may be considered that a single measurement is sufficient to determine the unique time necessary to load each slot. However, this invariability is obtained only if the memory refresh operations are deactivated and if it is the periodicity of accesses by domain 335 to each memory page that assures maintenance of the shared memory.

The WCET problem of domain 330 then consists only in calculating the WCET of arbitrarily complex programs, considered individually, for each of the calculation slots, and independently of the complexity of domain 335.

This breakdown into domains 330 and 335 can be achieved on traditional single-core or multi-core processors provided with cache memories and adequate instruction sets by synchronizing the bus units of the cores and making them play the role of the system being employed to maintain coherence of memories 310-1 to 310-8.

FIG. 3b illustrates an example of architecture of a multi-core SoC adapted to employment of the invention.

In this case, SoC 300' comprises the eight cores 305'-1 to 305'-8, referenced generically by 305, with which there are associated private cache memories referenced generically by 340, 345 and 350. For example, cache memory L1_I, referenced 340-1, cache memory L1_D, referenced 345-1, and cache memory L2, referenced 350-1, are associated with core 305'-1. Similarly, cache memory L1_I, referenced 340-8, cache memory L1_D, referenced 345-8, and cache memory L2, referenced 350-8, are associated with core 305'-8. The same applies for the other cores.

Each system formed by a core and the associated private cache memory is connected to a fast data bus, referenced 320', which itself is connected to memory controllers 355-1 and 355-2, generically referenced 355.

It should be noted here that core 305'-8 is dedicated here to management of physical inputs/outputs.

By way of illustration, cores 305'-1 to 305'-8 may have an internal frequency of 1.6 GHz. The data bus connecting the cores to the memory controllers may also use a frequency of 1.6 GHz. Thus, if the volume of data exchanged between the memory controllers and the cache memories, comprising the instructions, the written data and the read data, is 192 KB, the loading/unloading time is then approximately 25 µs, including the sharing of the channel between two cores and the memory controllers as well as the overflow, referred to as overhead in English terminology, associated with the configuration descriptors of the next slot.

Again according to this example, the time of execution of the instructions, representing approximately two thirds of the data exchanged, with a ratio of one instruction per three cycles of a core, is approximately 54 µs at 1.6 GHz.

Furthermore, since the applications generally necessitate memory space larger than the capacity of the cache memories specific to each core, they must be subdivided into several phases. Each phase is processed in one execution slot. The volumes of instructions and data involved in each slot must be compatible with the capacity of the different cache memories. In particular, the subdivision must achieve the smallest possible number of slots, with the slots achieving as many processing operations as possible. This subdivision is preferably implemented prior to its execution by a software generating service.

FIG. 4, comprising FIGS. 4a to 4d, illustrates an example of a mechanism by which each core in transfer phase of a multi-core processor can access the memory controllers of this processor.

As indicated in the foregoing, to avoid specializing the cores over part of the applications, it is necessary to separate the phases of loading and unloading into lots equilibrated over each memory controller. This subdivision must also separate the loading and unloading operations in order to reduce and simplify the access combinations obtained by combining two cores (combinations reduced to all cores in loading phase or to all cores in unloading phase). An important consideration of the separation of loading and unloading operations is the ease of constructing an operating model of the bus units of cores, of the interconnection network of cores and of memory controllers. For the cores themselves, it would be very difficult to establish a bus unit model interlacing the memory accesses in some way, but it would seems easier to construct two half-modules, one for loading operations and one for unloading operations. Thus, even if a processor is complex, it is nevertheless possible to "simplify" it by considering its behavior only for a simple program, in this case a loading sequence and an unloading sequence that are not correlated, meaning that the completion of one instruction does not block the following instructions.

As illustrated in FIG. 4a, first a first half of the cores in transfer phase accesses the first controller and the second half accesses the second controller. Thus cores 305'-1 and 305'-2 access memory controller 355-2, while cores 305'-3 and 305'-4 access memory controller 355-1 and cores 305'-5 to 305'-8 are in execution phase and cannot access memory controllers 355-1 and 355-2.

Secondly, as illustrated in FIG. 4b, the second half of the cores in transfer phase accesses the first controller and the first half accesses the second controller. Thus cores 305'-1 and 305'-2 access memory controller 355-1, while cores 305'-3 and 305'-4 access memory controller 355-2 and cores 305'-5 to 305'-8 are still in execution phase and still cannot access memory controllers 355-1 and 355-2.

The first and second steps illustrated in FIGS. 4a and 4b are repeated so that, during a first period, memory controllers 355-1 and 355-2 are used for unloading data and, during a second period, memory controllers 355-1 and 355-2 are used for loading data. In this case the first and second periods have an identical duration, the duration of both the first and second periods being identical for each memory controller.

In this way, the sequence of operations consists in unloading all of the data by crossing the links between the memory controllers and the cores in transfer phase at a given instant then in loading the new data by again crossing the links between the memory controllers and the cores in transfer phase at a given instant.

Then the cores reverse roles. In other words, the cores that were in transfer phase pass into execution phase, while the cores that were in execution phase pass into transfer phase. Thus, thirdly, as illustrated in FIG. 4c, cores 301'-5 and 305'-6 access memory controller 355-2, while cores 305'-7 and 305'-8 access memory controller 355-1 and cores 305'-1 to 305'-4 are in execution phase and cannot access memory controllers 355-1 and 355-2.

Then, fourthly, as illustrated in FIG. 4d, cores 305'-5 and 305'-6 access memory controller 355-1, while cores 305'-7 and 305'-8 access memory controller 355-2 and cores 301'-1 to 305'-4 are still in execution phase and still cannot access memory controllers 355-1 and 355-2.

Once again, the third and fourth steps illustrated in FIGS. 4c and 4d are repeated so that, during a first period, memory controllers 355-1 and 355-2 are used for unloading data and, during a second period, memory controllers 355-1 and 355-2 are used for loading data. In this case the first and second periods have an identical duration, the duration of both the first and second periods being identical for each memory controller.

In this way, the sequence of operations similarly consists in unloading all of the data by crossing the links between the memory controllers and the cores in transfer phase at a given instant then in loading the new data by again crossing the links between the memory controllers and the cores in transfer phase at a given instant.

Mastery of the numbering of page changes within the memories being used requires that two cores are not permitted to access the same banks during the same transfer phase. That imposes additional constraints on two cores operating at the same time for the same application. In practice, it requires that two cores do not simultaneously access the memory being used for an application. The I/O server presented hereinafter is a special case, because, by definition, it accesses all of the applications. The objective is then to place the accesses of applications to their I/O at different dates of the I/O server.

Each core possesses permanently, or in other words locked in cache memory, an instance of a supervision software whose task is to sequence all of the slots to be executed on the core. For example, for each execution slot, it performs the following operations:

reading, in a configuration table stored in a memory accessed via a memory controller, information items of blocks to be loaded into the cache memories and of information items to be transmitted;

loading of instructions, constants and data into the cache memories;

executing the contents of the slot;

waiting for the end of the execution slot; and, transmitting the modified data via the memory controllers.

The worst case of transfer can be determined via two approaches:

if few time configurations exist, by measuring whether it is possible to measure them and to predict, for each access sequence, the time of each access; and by constructing a multi-core system model limited to the instruction sequences in the supervision software. It is then possible to know the state of the cores at any instant. However, this approach assumes that the SoC design information items for modeling the transfer process are known.

It should be recalled here that, in conformity with the invention, the cores do not have access to the memory controllers during their execution phase. In other words, the cores do not have any access to addresses not already present in cache memories. The restriction of execution to only the data and instructions loaded in cache memory therefore has the same effect as programming of the unit for managing the memory, referred to as MMU (initials for Memory Management Unit in English terminology), with the granularity of the lines of the cache memories, since any access other than addresses determined by the placement result would have the effect of triggering an access violation exception.

If an application is at the origin of an error in a cache memory, whether because of a bug, fault or alteration of SEU type (initials for Single Event Upset in English terminology, representing an alteration of state of a bit in a memory or a register due to the passage of a cosmic ray), the core is likely to initiate an access to the memory controllers. However, this access is denied, and causes an exception, which is detected by the supervision software, which deactivates the slot, the core or the application to which the slot belongs. Of course, it is assumed here that such a protection mechanism could be established on the multi-core system. An SoC designed explicitly for this use very simply offers this opportunity.

Alternatively, it is possible, at the bus arbitration system, to deny the requests of the cores in execution phase. Another solution consists in triggering an interrupt on a bus access observed by a means normally dedicated to debugging. As regards the cores, it is also possible to map the memory controllers to different addresses for cores accessing the memory at different instants and then to map the memory controllers physically to the addresses expected by the cores having access to the memory at that instant. In general, the simplest situation is that the SoC has a DMA capable of loading, into the cache memories or the local memory of each core, the data that it needs for the next slot.

The cache memories preferably contain either indefinitely locked data, or in other words data locked throughout the entire duration of the time-critical phase, or data locked for the duration of a slot. The closest cache memory of the cores, reserved for the instructions, is locked with the most critical code elements, for example a library of frequently called routines. The most remote cache memory advantageously contains the application code and the tables of the most voluminous constants, which have the smallest usage-to-volume ratio.

The dependent data of the slots are loaded into the cache memory from a table of descriptors, itself contained in the memory accessible via a memory controller and loaded in cache memory. It is possible to construct tables whose excess, referred to as overhead in English terminology, does not exceed one percent by volume. At the end of the execution slot, the table of descriptors is also used to transmit the modified expected data (flush operation). It is also necessary to be certain that an edge effect cannot exist due to unmodified data remaining in cache memory, for example by globally invalidating the cache memories (after the locked remanent data have been saved if necessary in another cache memory). By way of illustration, the non-LRU cache memories (initials for Least Recently Used in English terminology) do not guarantee that the data of the old slot will necessarily disappear to the benefit of the data of the new slot.

An important aspect for employment of the invention lies in the good subdivision of instructions and data to permit construction of calculation slots that make best use of the resources of the cores. Thus each slot must preferably satisfy the following conditions:
- execution must not cause any error in the cache memories, meaning that all the data required by an execution slot must be available in cache memory;
- the volumes of instructions and data must respect the sizes of the cache memories;
- the worst case execution time, or WCET, must be shorter than the duration of the execution slots; and
- the execution must respect the constraints on establishment of order.

In addition, the processing operations must be reasonably divisible and not strongly sequential, in order to leave a few degrees of freedom for the placement solution, and the ratio between instructions and data, or in other words the calculation density, must be preferably high, in order that the solution be efficient. In other words, when the cache memories are loaded with instructions and data, it must be possible for the cores to execute a large number of instructions before they have to return to the bus to update their cache memory. Thus, for example, it is desirable not to use any function that necessitates large tables of data, which would have the effect of blocking a large part of the cache memory for only a few instructions.

However, numerous avionic applications, such as the electrical flight control applications, are written in the form of nodes, such as SCADE nodes (SCADE is a trademark), which possess such properties. In addition, with the exception of certain time constraints, the establishment of the order of the nodes is unrestricted.

The placement of processing operations in slots is achieved off-line, or in other words before execution of the slots, by a tool of the software generation chain. The principle is to resort to the different multi-objective methods available for optimization under constraints, in order to solve placement of instructions and data in static manner. Off-line placement of processing operations in execution slots is essential for finding the most optimum solution possible. It makes it possible to obtain an improvement of the WCET and even the minimum for the application in question, while benefiting from the improvement of determinism due to the previously defined constraints of locality of the data.

Advantageously, the constraint-solving application makes it possible to restrict the mathematical expressions to linear equations, in order to solve the system of equations and to optimize a function (operational search). In this case the solution is preferably restricted to complete solutions. Such a solution, referred to as linear programming in integral numbers (PLNE) or Integer Linear Programming (ILP) in English terminology, is intended to express a problem by a system of linear equations and/or inequalities with (partly) complete solutions.

A solution of PLNE type can be achieved by the simplex method, which may be proposed by combinatorial optimization tools, and which is supplemented by heuristics to make the problem calculable.

To facilitate the task of the constraint-solving application, it is preferable to simplify the problem or to subdivide it into several simpler sub-problems.

According to a particular embodiment, the constraint-solving application is asked to choose a slot for each node. The index i, varying from 1 to S, in this case denotes the slot numbers, while the index j, varying from 1 to N, denotes the numbers of nodes, also referred to as knots, or in other words indivisible fractions of the application.

There is defined a Boolean variable N denoting the state of a node such that Nj,i=1 if the node j is placed in the slot i and that Nj,i=0 if the node j is not placed in the slot i. Nj,i is referred to as "decision variable", indicating the decision on placement of the node Nj.

Each node Nj is characterized by a volume of instructions and of constants of large size, referred to as L2j, specific to the node j, to be placed in cache memory L2, as well as by a volume of variables and of constants of small size, referred to as L1j, specific to the node j, to be placed in the data cache memory L1D. Each node Nj is also characterized by a list of variables shared with other nodes and by a worst-case execution time WCETj.

The constants of large size, for example interpolation tables, are to be placed in cache memory L2 in order not to exhaust the capacity of cache memory L1D. The choice of the transition threshold between cache memories L2 and L1D is determined by the placement tool. The expression of constraints of size over cache memories L2 and L1D is given here by way of example, and it corresponds to placement over two resources having different characteristics, one, fast for data that are not very abundant, is to be reserved for data critical to the execution time, while the other is to be used for the instructions and the less critical data. This principle may be adapted to other distributions of resources.

It is then necessary to take into consideration the following constraints, expressed in the form of linear inequalities, each slot must not exceed the capacity MAXL2 of cache memory L2:
=>for all i, $L2_1 * N_{1,i} + L2_2 * N_{2,i} + \ldots + L2_N * N_{N,i} \leq MAXL2$
i.e., $$\forall i, \sum_{j=1}^{N} L2_j \times N_{j,i} \leq MAXL2$$

each slot must not exceed the capacity MAXL1D of cache memory L1D:
=>for all i, $L1_1 * N_{1,i} + L1_2 * N_{2,i} + \ldots + L1_N * N_{N,i} + RESVL1D \leq MAXL1D$
i.e., $$\forall i, \sum_{j=1}^{N} L1_j \times N_{j,i} + RESVL1D \leq MAXL1D$$

each slot must not exceed a maximum execution time MAXWCET:

=>for all i, $WCET_1 * N_{1,i} + WCET_2 * N_{2,i} + \ldots + WCET_N * N_{N,i} \leq MAXWCET$
i.e., $$\forall i, \sum_{j=1}^{N} WCET_j \times N_{j,i} \leq MAXWCET$$

It is also necessary to force the placement solution to include each node in each slot one time and only one time,
=>for all j, $N_{j,1} + N_{j,2} + \ldots + N_{j,S} = 1$
i.e., $$\forall j, \sum_{i=1}^{S} N_{j,i} = 1$$

It should be noted here that cache memory L1D is used not only for the constants of small size and the variables but also for the variables shared among several nodes. The value RESVL1D represents this space. In a simplified approach to the problem, separating the problem of placement of nodes from the problem of placement of variables, it is recommended that a fixed value ending in a realizable and satisfactory solution be chosen. In a solution combining optimization of the placement of nodes and variables, RESVL1D is chosen as representing exactly the occupation of variables in cache memory L1D.

When an order-establishing constraint exists between two nodes, for example if Nj must be executed before Nk, the following series of constraints is added (there exists an Nk,i for each slot that is a candidate for placement):
for all j, k such that j must precede k, for all i≥2, $N_{k,i} + N_{k,i+1} + \ldots + N_{k,S} \geq N_{j,i}$
i.e., $$\sum_{l=i}^{S} N_{k,j} \geq N_{j,i}$$

Thus, if Nj is placed in slot i, then Nk must also be placed in slot i or in one of the following slots. If there also exist constraints prohibiting separate placement of two nodes (indivisible nodes), they may then share the same decision variable.

Furthermore, in addition to sharing variables, the nodes may share constants. In an exhaustive representation of the problem, it is possible to express the decisions on placement of these constants precisely.

However, the sharing of constants of small size is generally not very defining as regards dimension and does not justify making the problem more complex. The constants of small size may be duplicated, or in other words they may find different solutions in each slot, without significant cost, by using placements not used in the distribution of variables in memory. The constants of large size, generally not very numerous, for example trigonometric interpolation tables, nevertheless justify a search for optimization.

The variable Cc,i is defined as equal to unity if the constant Cc is referenced in slot i. In the opposite case, it is equal to zero.

A constraint on Cc,i is added in the following manner,
for all slots i, for all nodes j referencing Cc, Cc,i≥Nj,i Thus, starting from the instant at which node j using Cc is placed in slot i, Cc,i is forced to 1. It should be noted that Cc,i is not really a decision variable, it is a consequence of the decision on placement of nodes Nj.

If the constants of large size are placed, for example, in cache memory L2, the constraint on cache memory L2 is reformulated in the following manner,
for all i, $L2_1 * N_{1,i} + L2_2 * N_{2,i} + \ldots + L2_N * N_{N,i} + \ldots +$ sizeof$(Cc) * Cc,i + \ldots \leq MAXL2$
i.e., $$\forall i, \sum_{j=1}^{N} L2_j \times N_{j,i} + \sum_{c=1}^{C} sizeof(C_c) \times C_{c,i} \leq MAXL2$$

where sizeof(Cc) represents the size of the constant Cc, C being the number of constants of large size.

The same formalism may be applied for every shared variable Vv. In other words, Vv,i=1 if the variable Vv is referenced in slot i, otherwise Vv,i=0.

A constraint is also added to Vv,i in the following manner,
for all slots i, for all nodes j referencing Vv, Vv,i≥Nj,i To restrict the global complexity of placement, it is possible to subdivide the problem by first searching for a solution to placement of nodes presenting criteria of grouping references to the variables (and constants) and by searching for a solution minimizing the sum of the Vv,i over all variables Vv and all slots i. Thus it is necessary to minimize the following relationship, $$\Sigma V = \sum_{j=1}^{N} \sum_{i=1}^{S} V_{j,i}$$

It should be noted that this function is not intended to minimize the worst case of filling the slots. In practice, minimizing the number of references to variables consists instead of maximizing the occupation of certain slots. However, it may be desirable to retain a certain margin in the cache memory in each slot in order to accept modifications of the software to be placed without having to relaunch the placement tool and possibly obtain a placement completely different from the preceding. This is useful in particular from the viewpoint of qualification and incremental verification, where it then is not necessary to retest the unmodified software parts.

For placement of variables, decision variable are defined as follows: Mv,b=1 if the variable Vv is placed in block b, otherwise Mv,b=0, where b is a block index varying from 1 to B (in this case a block is a line of cache memory or a group of lines of cache memory). As the blocks become larger, it becomes more difficult to find placements that use the space of the blocks efficiently. In contrast, the complexity of the problem is reduced (fewer decision variables) and the efficiency of cache memory operations is improved.

This results in the following constraints, expressed in the form of linear equations:

do not allocate variables in a block beyond its capacity MAXBLOC,
=>for all blocks b, sizeof$(V_1) * M_{1,b} + \ldots +$ size$(V_v) * (M_{v,b} + \ldots \leq MAXBLOC$ i.e., $$\forall b, \sum_{v=1}^{NbVar} sizeof(V_v) \times M_{v,b} \leq MAXBLOC$$

allocate each variable one time and only one time,
=>for all variables Vv, $M_{v,1}+ \ldots +M_{v,b}+ \ldots =1$
i.e., $$\forall v, \sum_{b=1}^{B} M_{v,b} = 1$$

The loading of a block b into a slot i is identified by constraint in the following manner,
for all variables Vv referenced by all nodes Nj, $H_{b,i} \geq M_{v,b}+N_{j,i}$ where,
Hb,i=0 implies that the slot i is empty and that the block i is also empty (which is possible only if excess slots and blocks were defined);
Hb,i=1 implies that there does not exist any node Nj placed in slot i and accessing variables placed in block b, and therefore that block b is not required by slot i; and
Hb,i=2 implies that there exists at least one node Nj placed in slot i and accessing at least one variable Vv placed in block b, and therefore that block b is required by slot i.

For conjoint optimization of the placement of nodes and variables, it is then possible to supplement the second mentioned constraint by replacing the value RESVL1D by allocation of blocks intended for the variables. It is then necessary to minimize the value USAGE (where USAGE≤MAXL1D) by respecting the following constraints,
for all i, $L1_1*N_{1,i}+L1_2*N_{2,i}+ \ldots +L1_N*N_{N,i}+BLK\_SZ*(H_{1,i}+ \ldots +H_{B,i}-B) \leq USAGE$
where BLK_SZ represents the size of a block.

Minimizing the value USAGE has the effect of searching for the placement of variables that minimizes the worst case of filling of cache memory L1D by slots. Naturally, placement on a monolithic memory zone of instructions and data would lead to different formulas, and placement on a memory hierarchy with more levels would have been different even without, for all that, invalidating the principles cited here.

To formulate the optimization of the placement of variables after the placement of nodes, or in other words to achieve the placements in two steps, first the nodes by optimizing the references to the variables, but without optimizing the placement of variables in lines of cache memories, then the placement of variables by benefiting from the result of the nodes, it is possible to reformulate the constraints more simply according to the following rules, the variables all of whose references have been placed in the same slot may be integrated into the space allocated in cache memory L1D for the variables and the constants of small size specific to the nodes of the slot; and, for the variables Vv shared by the slots i, for each block b, the following constraint is defined, Hb,i≥Mv,b with Hb,i=1 if there exists at least one variable Vv referenced for the slot i and placed in the block b.

It is then necessary to search for the function that minimizes USAGE (USAGE≤MAXL1D) by respecting the following constraints, for all i, USAGE_L1i+BLK_SZ*(H1,i+ . . . +Hb,i)≤USAGE
where USAGE_L1i is obtained from the result of placement of nodes, or in other words,
USAGE_L1i=$L1_1*N_{1,i}+L1_2*N_{2,i}+ \ldots +L1_N*N_{N,i}$+sizeof (variables shared only in i)

The variables and the constants of small size specific to the nodes may be separated without difficulty into modified blocks and unmodified blocks in order to minimize the unloading number (flush) at the end of the slot. To optimize the placement of shared variables and to guarantee that the solution respects the maximum bound of the unloading number (flush), it is necessary to add supplementary constraints. Thus, for all variables Vv referenced in writing by i, for all blocks b,
Wb,i≥Mv,b In addition, for all slots i, the function that minimizes the value USAGE (USAGE≤MAXL1D) is searched by respecting the following constraints:
for all i, USAGE_W_L1, +BLK_SZ*$(W_{1,i}+ \ldots +W_{B,i})$ ≤MAX_FLUSH
where the value USAGE_W_L1i is obtained from the result of placement of nodes and corresponds to the size of all data undergoing modification in slot i and known before the constraints of placement of variables are solved.

Some simplifications can be made to the equations described hereinabove. For example, it is possible to calculate only a single placement decision for all variables sharing exactly the same list of referenced slots.

According to one particular embodiment, it is possible to simplify the problem by subdividing the nodes or the variables into several subsets. This choice of preliminary subdivision may be oriented by the designer of the software to be placed, for example because he knows that his application is composed of three largely independent subsystems, or by the placement tool using heuristics, for example by identifying nodes that reference the same variables. Each sub-problem is then the object of independent placement of its nodes and of its specific variables. One last placement of shared variables terminates the solving of the problem.

For example, the nodes may be subdivided into several subsets according to periodicities. The order of the slots is then established at the periodicity of the nodes. It is also possible to subdivide the specification being used into relatively independent functional blocks. Other alternatives are possible, especially by expressing a preliminary system of constraints intended to distribute the nodes into a small number of subsystems rather than distributing the nodes directly into a large number of slots.

Since the sought optimum may be degraded by the heuristics (simplifying choice) applied in places, non-exhaustive methods may be employed in order to solve the problem of combinatorial optimization represented by the placement problem.

While retaining the objective functions described in the foregoing and the constraints associated with the architecture being employed, it is possible to use optimization methods such as the algorithm for estimating distribution, referred to as estimation of distribution algorithm in English terminology, the methods based on the evolutionary algorithm (or genetic algorithm) principle, the neural networks or else a particle swarm algorithm, referred to as particle swarm optimizer in English terminology.

Since combinatorial optimization is an intensively studied and constantly evolving research topic, numerous approaches are available, each offering its advantages and disadvantages.

For an estimation of distribution algorithm, the idea in this case is to search for an optimization of placements of nodes then of variables, or even of variables only, since the objective functions permitting iterative searching for a better solution are in particular the objectives of minimum data exchanges between the slots and the objectives of minimizing the execution time by very fine localization of data (minimizing the number of lines of cache memory that a calculation sequence must load or unload at the level of a cache memory L1 within one execution slot).

The presence of constraints of different natures may lead to envisioning a search for the optimum on the basis of several optimization methods.

For example, concerning the flight control application, it is possible to distinguish objectives and constraints intended to improve the WCET by fine localization of the data of constraints of establishment of order and sequentiality of sets of processing operations. These pose more difficulties for an estimation of distribution algorithm but, since they do not concern the set of processing operations, they may be the object of a different processing. There again, the prior art concerning combinatorial optimization makes it possible to adopt a set of approaches yielding results that are more or less satisfactory depending on the constraints of the application under consideration and of the hardware architecture envisioned in order to achieve the sought subdivision into calculation slots.

According to the system of the invention, the calculation slots have no access to the physical inputs/outputs, referred to as I/O. They are able to access only the variables that have been transferred into cache memory by the supervision software. Thus, as illustrated in FIG. 3b, one core, or several if necessary, is preferably dedicated to management of the physical I/Os. This core, referred to as I/O core, hosts a function of "I/O server" type, as opposed to the other cores, which may be regarded as "calculation servers". The I/O core produces the variables corresponding to the deformatted inputs and consumes the variables corresponding to the unformatted outputs of the module. If the calculation load due to the formatting functions of the I/O core is too large, it is possible to envision assigning these formatting operations to the calculation cores and allowing only the data transfers over the external buses of the SoC to the I/O server. As seen by the calculation cores, the I/O core is a core that produces and consumes generalized data.

The activities of the I/O server cover the operations of access to the physical registers and to the bus controllers, for example to Ethernet, PCIe controllers or to a nonvolatile memory, and the operations of verification and conversion of data to the known data structures and types of applications. These operations are defined by configuration tables, loaded during the transfer slots, scheduled by the placement tool, at the same time as scheduling of the operations of loading of the calculation slots. The I/O core possesses its software and certain data in resident status, and it uses its transfer phases to load and unload the values of the inputs and outputs proper as well as the configuration table elements necessary for processing these values.

The I/O core is preferably the only core having access to buses of PCIe, Ethernet or other type. Since the I/O core is unique, and subject to the reservation that its accesses do not perturb the accesses of the calculation cores to the memory controllers, it has full-time use of these buses. On the other hand, since it is generalized from the viewpoint of accesses to the memory controllers, its slots and access ranges are strictly static, scheduled at the same time as the scheduling of accesses of the calculation cores.

Furthermore, although bus controllers must perform data transfers of DMA type, they must be able to reach memory targets without perturbing the calculation cores in transfer phase. Thus, according to one particular embodiment, a memory component must be available in order that these DMA transfers can be achieved without affecting the memory being used by the calculation cores. This component may be the cache memory, preferably that of the I/O core, which is used as target. It may also be another cache memory or memory zone accessible by addressing in the SoC, possibly even an external memory layer addressed by a dedicated memory controller.

The activities of the I/O server are subdivided into execution and transfer slots, strictly synchronous, equilibrated and scheduled, just as the activities of calculation cores (or application cores). The I/O core uses its transfer slots to read the configuration tables, to deposit the inputs in memory and to retrieve the outputs. The execution slots are dedicated to driving bus controllers. The distribution of operations per slot is achieved by the off-line placement tool described in the foregoing, while respecting the processing capacities of the I/O core and of the bus controllers, in time coherence with the applications.

For these purposes, the architecture of the SoC must offer sufficient segregation of paths for the exchanges between the I/O core and the bus controllers during the execution slots, to avoid interfering with the exchanges between the memory and the calculation cores in transfer phase.

The physical inputs of the I/O server may be classified in two families:
  the synchronous inputs of applications, which are acquired at the initiative of applications and which may be placed as regards time in the slots of the I/O server. These inputs generally consist in reading one or more registers to receive an information item; and
  the asynchronous inputs of applications, which are acquired according to external events, not correlated with the execution of applications. Their acquisition therefore cannot be scheduled in entirely deterministic manner as is the case for application processing operations or the synchronous inputs. These inputs generally consist of frames or messages received on digital buses such as Ethernet.

Only the synchronous outputs, or in other words the outputs emitted or generated at the initiative of applications, are considered here. However, for the possible asynchronous outputs, for example an output of a device being interrogated by the controller of an asynchronous slot-sequencing bus, it is possible to consider that the device has a mailbox that stores the deposited data. The deposition of data in the mailbox is synchronous with the slots, while emission over the bus is asynchronous.

In this way, except for the asynchronous inputs, it is possible to establish static scheduling, via the off-line tool, to determine the accesses to the configuration tables and to the input/output variables and the driver activities of the I/O controllers.

For the asynchronous inputs, the I/O server must have one configuration table element in residence in its private cache memories. This element must permit it to correlate the unscheduled arrival of the event with a request for access to a precise memory zone, then at a later time to use a scheduled date of access to that zone to acquire, if necessary, the supplementary configuration table elements and to deposit the data that have been reformatted or that do not correspond to the event. The raw data must be stored in cache memory between the instant of arrival and the opening of the memory access. The arrival of the event is unscheduled in the sense that the instant at which it should arrive is unknown. However, the very existence of the event is scheduled, by the fact that addresses in memory and scheduled opportunities for access to the memory have been assigned to it.

If the execution slots over the calculation cores are grouped so that a single application is active simultaneously over all of the cores, it is possible to reserve, on the I/O server, a prolog slot for the inputs and an epilog slot for the outputs, so that the I/O server could be considered as being exclusively used by the active application throughout this entire duration. This alternative, according to which all of the cores are dedicated to one application for a specified duration, or in other words several slots, necessitates that the problems of determinism of memory controllers due to page changes be solved. This may be achieved, for example, by the use of a sufficiently precise model of the memory controllers applied to the lists of memory transfers required by each slot. This alternative also necessitates that the applications distributed in this way have sufficient freedom of establishment of their order that they can be distributed efficiently over all the cores in parallel manner.

Alternatively, mixing of applications over the different calculation cores may be authorized. In this case, the slots of the I/O server preceding or following the calculation slots are provided with resources of CPU time and static bus accesses (equivalent to micropartitions). These resources are known by the application placement tool, so that these applications do not exceed their assigned resources.

If the SoC has several Ethernet controllers, it is possible to create AFDX or Erebus inputs/outputs in the software. However, these implementations must remain compatible with the constraints of static nature and determinism necessary to subdivision into calculation slots.

For these purposes, the Ethernet controllers must not access the central memory being used by the calculation cores and must work with an independent memory and bus resources. It is possible that the resources of bus type may be shared if "instantaneous" priority management exists, capable of serving the requests of application cores without preemption, or without observable delay in the case of conflict, with the accesses of Ethernet controllers or the I/O server, and without jeopardizing the WCET analyses of the I/O server. This approach implies that the accesses of the Ethernet controllers could be transparent relative to calculation cores. For performance reasons, it is also desirable that the data written by the external buses, for example Ethernet or PCIe, be transferred into the local memory of the I/O server. This transfer may be achieved either directly by the DMA of the Ethernet controller or by a mechanism equivalent to that used for preloading of cache memories.

The operations of AFDX emission and reception are preferably adapted to be achieved in the IO core by respecting the following constraints:
- the IO core must respect the concept of communication slots and processing slots;
- the Ethernet controllers must not perturb the memory controllers or the other cores; and
- since the cache memories of the IO core are too small to store the configuration and the variables associated with the AFDX interface in their entirety, they must be loaded in portions.

During data reception, the packets received by the Ethernet controllers are stored in the memory of the IO core. They are analyzed at the same rate as they are received then are transferred into other waiting queues. A configuration table resident in the local memory of the I/O server is used to associate the identifiers of the virtual connections (or VL, initials for Virtual Link in English terminology), referred to as VLID, of frames received at one or more of the scheduled windows for access by the I/O server to the memory. There exists a window for depositing the application part of the frame in memory and, if necessary, one or more other frames for reading the configuration table elements necessary for identification and complete processing of the frame, such as the destination IP/UDP addresses (initials for Internet Protocol/User Datagram Protocol in English terminology for identification of the destination port, the type and address for storage of the port in memory and the network surveillance information items. The configuration table resident in the local memory of the I/O server, whose size is on the order of a few kilobytes, is used for each received Ethernet frame. The redundancy and integrity management advantageously uses resources also stored in the local memory of the I/O server. If the search for ports necessitates a table that is too large to be stored in local memory, the elements of this table, necessary for processing of the VL identified by the configuration table resident in the local memory of the I/O server, are loaded into the memory-reading slots of the I/O server authorized for this VL, and only the waiting packets corresponding to these VLs are processed. If the capacity of the local memory of the I/O server permits, it is preferable, for reasons of simplicity and reduction of latency, to leave these tables in residence in the I/O server.

The emission activities of the I/O server are scheduled by the placement tool used for placement of application processing operations in the slots and for placement of slots on the cores. During emission, the configuration associated with a VL is loaded into the local memory in the scheduled cycle, as is the state of the ports associated therewith. If the emission conditions are respected, emission is triggered in the cycle at an instant defined by the configuration. Similarly, if the local memory of the I/O server permits, it is preferable to leave the configuration tables necessary for the emissions in residence.

FIG. 5 schematically illustrates a CPM whose architecture is based on a multi-core processor such as that presented in FIG. 3b, adapted to employ the invention where the AFDX functions are managed by software in the multi-core processor.

As illustrated, CPM 500 comprises multi-core processor 505, which in this case has in particular eight cores and two memory controllers. These memory controllers are used as interface between the cores and memories 510-1 and 510-2. CPM 500 additionally comprises a memory 515, for example a flash memory, for storing, for example, certain applications that must be executed by the cores of processor 505.

CPM 500 additionally comprises a network interface for receiving and transmitting data, in particular an AFDX interface, as well as the logic necessary for operation of the CPM. The AFDX function is achieved in this case by the multi-core processor, or in other words by software.

Of course, to satisfy specific needs, a person competent in the field of the invention will be able to apply modifications to the foregoing description.

The invention claimed is:

1. A method for loading and executing, with deterministic execution cycles, a plurality of instructions in an avionic system including at least one processor including at least two cores and at least one memory controller, each of the at least two cores including a private memory, the plurality of instructions being loaded and executed by execution slots, and the method comprising:

during a first execution slot:
authorizing a first of the at least two cores to access at least one memory controller, the first core transmitting to the at least one memory controller at least one datum stored in the private, previously modified, memory of the first core, and receiving at least one datum and at least one instruction of the plurality of instructions, the at least one datum and the at least one instruction received being stored in the private memory of the first core;

prohibiting a second of the at least two cores from accessing the at least one memory controller, the second core executing at least one instruction previously stored in the private memory of the second core;

during a second execution slot:
prohibiting the first core from accessing the at least one memory controller, the first core executing at least one instruction previously stored in the private memory of the first core; and authorizing the second core to access the at least one memory controller, the second core transmitting to the at least one memory controller at least one datum stored in the private, previously modified, memory of the second core, and receiving at least one datum and at least one instruction of the plurality of instructions, the at least one datum and the at least one instruction received being stored in the private memory of the second core.

2. A method according to claim 1, wherein the at least one processor further comprises at least one second memory controller, the method further comprising:

during a first phase of the first execution slot, authorizing the first core to access a first of the at least two memory controllers and prohibiting the first core from accessing a second of the at least two memory controllers;

during a second phase of the first execution slot, authorizing the first core to access the second memory controller and prohibiting the first core from accessing the first memory controller;

during a first phase of the second execution slot, authorizing the second core to access the first memory controller and prohibiting the second core from accessing the second memory controller; and during a second phase of the second execution slot, authorizing the second core to access the second memory controller and prohibiting the second core from accessing the first memory controller.

3. A method according to claim 1, wherein at least one of the at least two cores is dedicated to operations of transmission and reception of data to and from a network communication interface.

4. A method for processing a plurality of instructions to permit loading and executing, with deterministic execution cycles, the plurality of instructions according to claim 1, the processing method comprising:

subdividing the plurality of instructions into execution slots, each execution slot comprising a transfer sequence and an execution sequence, the transfer sequence permitting transmission of at least one datum previously stored in memory and the reception and storage in memory of at least one datum and at least one instruction, the at least one received datum being necessary for execution of the at least one received instruction and permitting execution of the at least one received instruction in autonomous manner during execution of the execution sequence.

5. A method according to claim 4, wherein the subdividing is based on solving a system of linear equations representing constraints on execution of instructions of the plurality of instructions according to at least one characteristic of a processor adapted to execute the execution slots.

6. A method according to claim 4, wherein a duration of the execution slots is constant and predetermined.

7. A method according to claim 6, wherein the duration is determined by the time of transmission of previously modified data and the time of reception of data and of instructions to be executed.

8. A device comprising means to implement the method according to claim 6.

9. An aircraft comprising the device according to claim 8.

10. A non-transitory computer readable medium comprising computer executable instructions to execute the method according to claim 1 when the computer executable instructions are executed in a processor.

* * * * *